(12) United States Patent
Sinnema et al.

(10) Patent No.: US 11,858,796 B2
(45) Date of Patent: Jan. 2, 2024

(54) CAPPER/DECAPPER SYSTEM AND METHOD

(71) Applicant: BD KIESTRA B.V., Drachten (NL)

(72) Inventors: Jurjen Sinnema, Joure (NL); Franciscus Feijen, Leeuwarden (NL); Harm W. van der Dong, Den Ham (NL)

(73) Assignee: BD KIESTRA B.V., Drachten (NL)

( * ) Notice: Subject to any disclaimer, the term of this patent is extended or adjusted under 35 U.S.C. 154(b) by 656 days.

(21) Appl. No.: 17/047,607

(22) PCT Filed: Apr. 18, 2019

(86) PCT No.: PCT/EP2019/060083
§ 371 (c)(1),
(2) Date: Oct. 14, 2020

(87) PCT Pub. No.: WO2019/202078
PCT Pub. Date: Oct. 24, 2019

(65) Prior Publication Data
US 2021/0147206 A1 May 20, 2021

Related U.S. Application Data

(60) Provisional application No. 62/659,915, filed on Apr. 19, 2018.

(51) Int. Cl.
*B67B 7/15* (2006.01)
*B67B 7/18* (2006.01)
(Continued)

(52) U.S. Cl.
CPC ............. *B67B 7/15* (2013.01); *B67B 7/182* (2013.01); *G01B 11/26* (2013.01); *G01D 5/20* (2013.01)

(58) Field of Classification Search
CPC .... B67B 7/00; B67B 7/15; B67B 7/16; B67B 7/164; B67B 2007/166; B67B 7/18;
(Continued)

(56) References Cited

U.S. PATENT DOCUMENTS

| 7,972,579 B2 * | 7/2011 | Brunner | .................... B01L 9/06 422/561 |
| 9,878,890 B2 * | 1/2018 | Mikhailov | .............. B67B 7/182 |

(Continued)

FOREIGN PATENT DOCUMENTS

| CN | 102841211 A | 12/2012 |
| CN | 104108671 A | 10/2014 |

(Continued)

OTHER PUBLICATIONS

Chinese Office Action received in corresponding CN Patent Application No. 201980025536.X, dated Jan. 26, 2022, pp. 10.

(Continued)

*Primary Examiner* — Robert J Scruggs
(74) *Attorney, Agent, or Firm* — Botos Churchill IP Law LLP

(57) ABSTRACT

A system and method for gripping, torqueing and releasing an element so as to cap and/or decap a container, such as those typically utilized to house specimens in laboratory environments. The system is driven by a single bi-directional motor linked to a coupler assembly via a rotating threaded shaft. The coupler assembly is configured to engage with an element, such as a cap or container, via mechanically-biased splines that are actuated without any complex linkages, or operative connection to the motor or other powered components. The system employs an ejector nut and an ejector, both of which are concentrically positioned about the threaded shaft. The ejector nut translates along the shaft as a function of the shaft's rotation, so as to (Continued)

permit the retraction of the ejector when an element is engaged in the coupler assembly or cause the ejector to extend into the coupler assembly to disengage the element. The direction and rotation of the motor is controlled by a system coupled to sensors positioned within the system. Such control system may include one or more processors, component interfaces, and data storage/memory. The sensors may include multiple optical, magnetic or mechanical means for monitoring one or more of the positions of the ejector nut and ejector along the threaded shaft, and/or the rotational position of the coupler assembly.

30 Claims, 24 Drawing Sheets

(51) Int. Cl.
 *G01B 11/26* (2006.01)
 *G01D 5/20* (2006.01)
(58) Field of Classification Search
 CPC ..... B67B 7/182; B67B 2007/188; B67B 3/20; G01B 11/26; G01D 5/20
 See application file for complete search history.

(56) References Cited

U.S. PATENT DOCUMENTS

| | | |
|---|---|---|
| 2008/0022808 A1 | 1/2008 | Owen et al. |
| 2015/0175398 A1 | 6/2015 | Christensen et al. |

FOREIGN PATENT DOCUMENTS

| | | |
|---|---|---|
| CN | 104444983 A | 3/2015 |
| DE | 29506035 U1 | 5/1996 |
| EP | 2962720 A1 | 1/2016 |
| JP | S41000953 B | 1/1966 |
| JP | H03226485 A | 10/1991 |
| JP | 2000142886 A | 5/2000 |
| JP | 2000512191 A | 9/2000 |
| JP | 2007526983 A | 9/2007 |
| KR | 20170029555 A | 3/2017 |
| WO | 2014185838 A1 | 11/2014 |

OTHER PUBLICATIONS

Office Action for corresponding Israeli Application No. 269446 dated Jun. 7, 2022 (3 pages).
Office Action for corresponding Korean Application No. 10-2019-7030974 dated Jul. 13, 2022 (14 pages).
Written Opinion issued in corresponding Singapore Application No. 11201908668Y dated Aug. 29, 2022, pp. 1-5.
International Search Report and Written Opinion from corresponding International Application No. PCT/EP2019/060083 dated Jul. 18, 2019 (13 pages).
Office Action from corresponding Japanese Patent Application No. 2020-557176 dated Feb. 10, 2023 (14 pp.).
Office Action from corresponding Japanese Patent Application No. 2020-557176 dated Sep. 5, 2023 (6 pp.).
Article 94(3) EPC issued in corresponding EP application No. 19719244.6 on Sep. 6, 2023 (5 pp.)., 5 pp.

\* cited by examiner

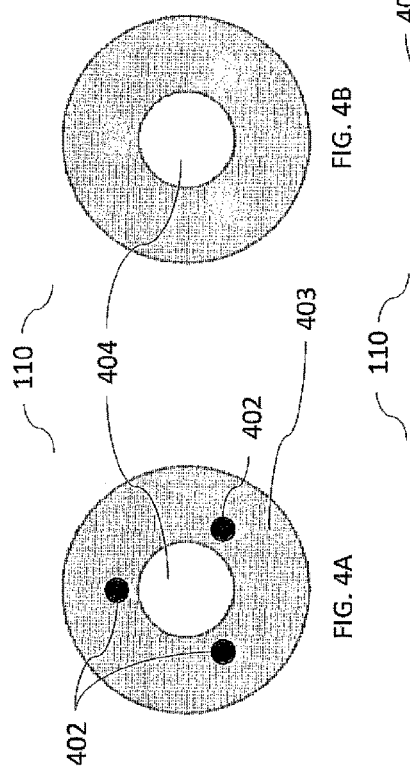
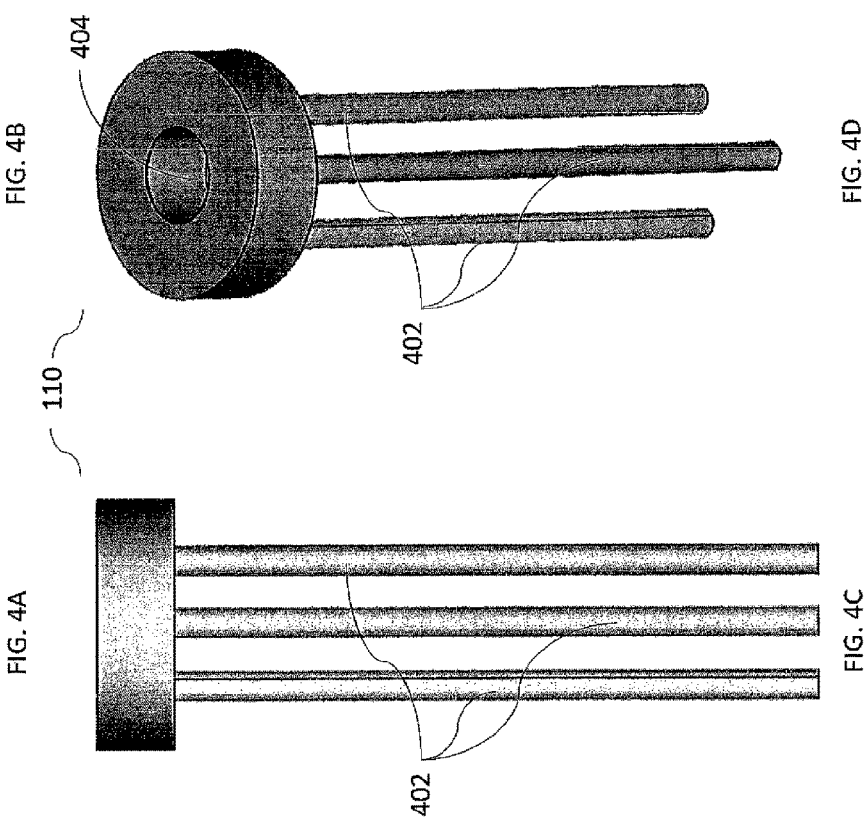
FIG. 4A  FIG. 4B  FIG. 4C  FIG. 4D

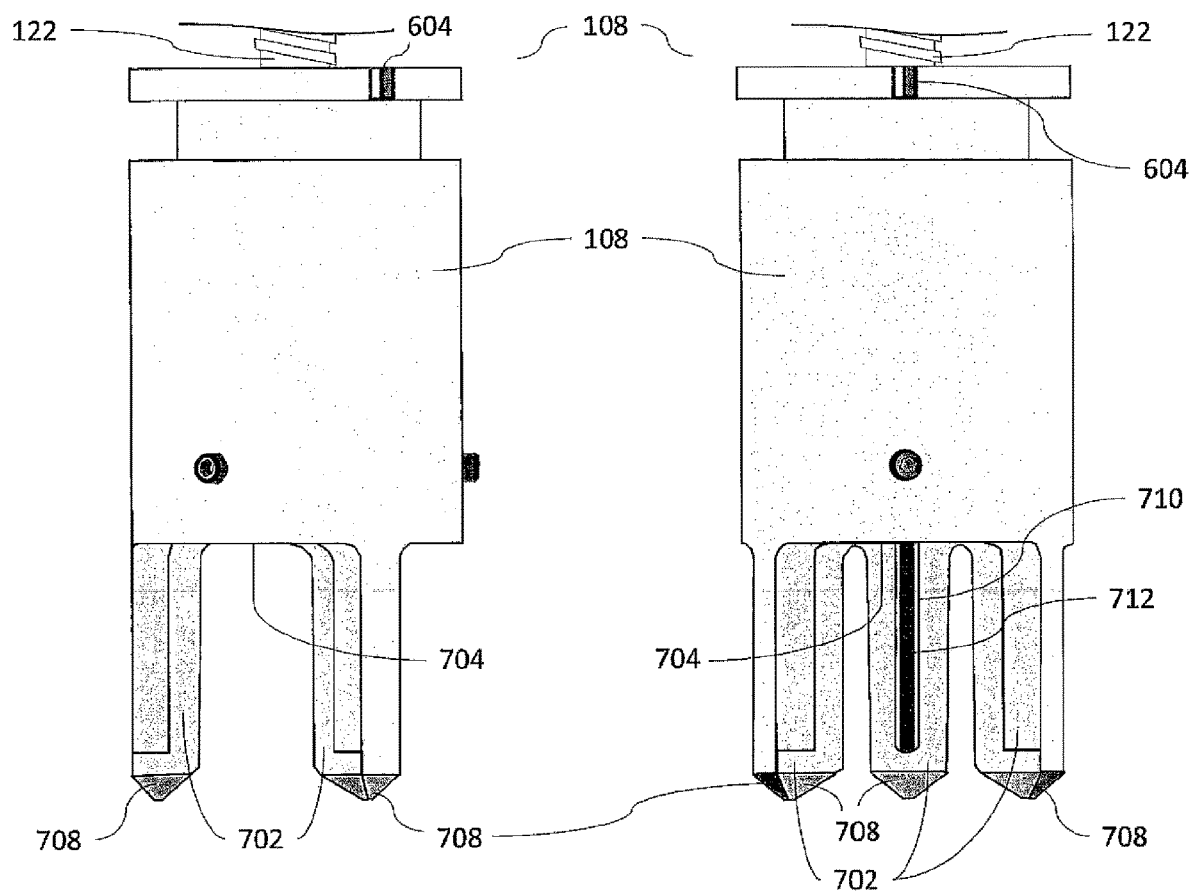

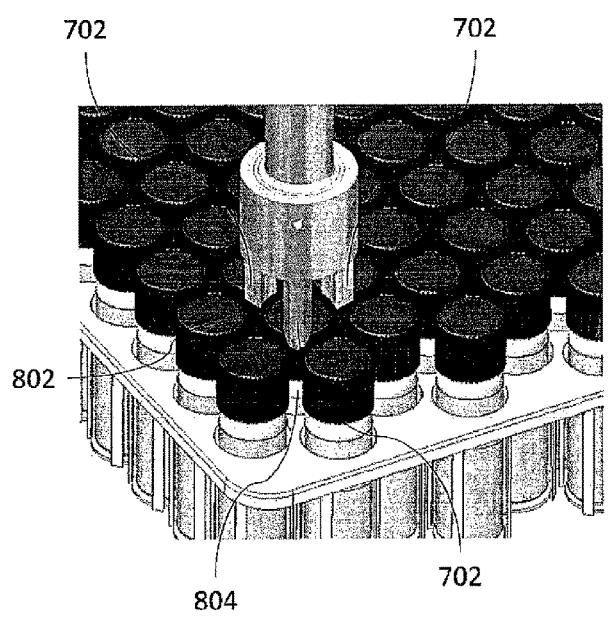
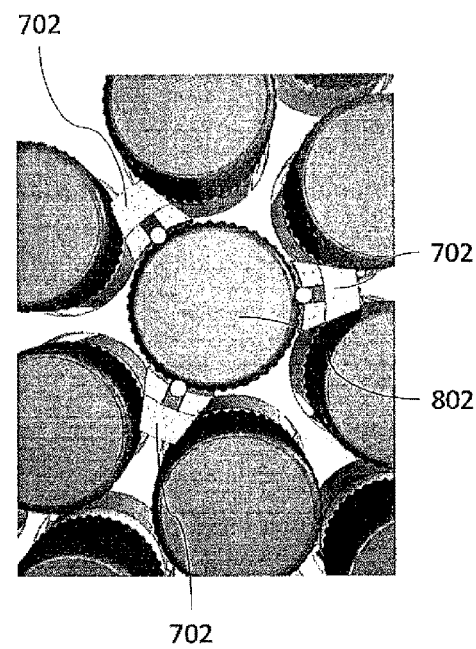
FIG. 8A
FIG. 8B

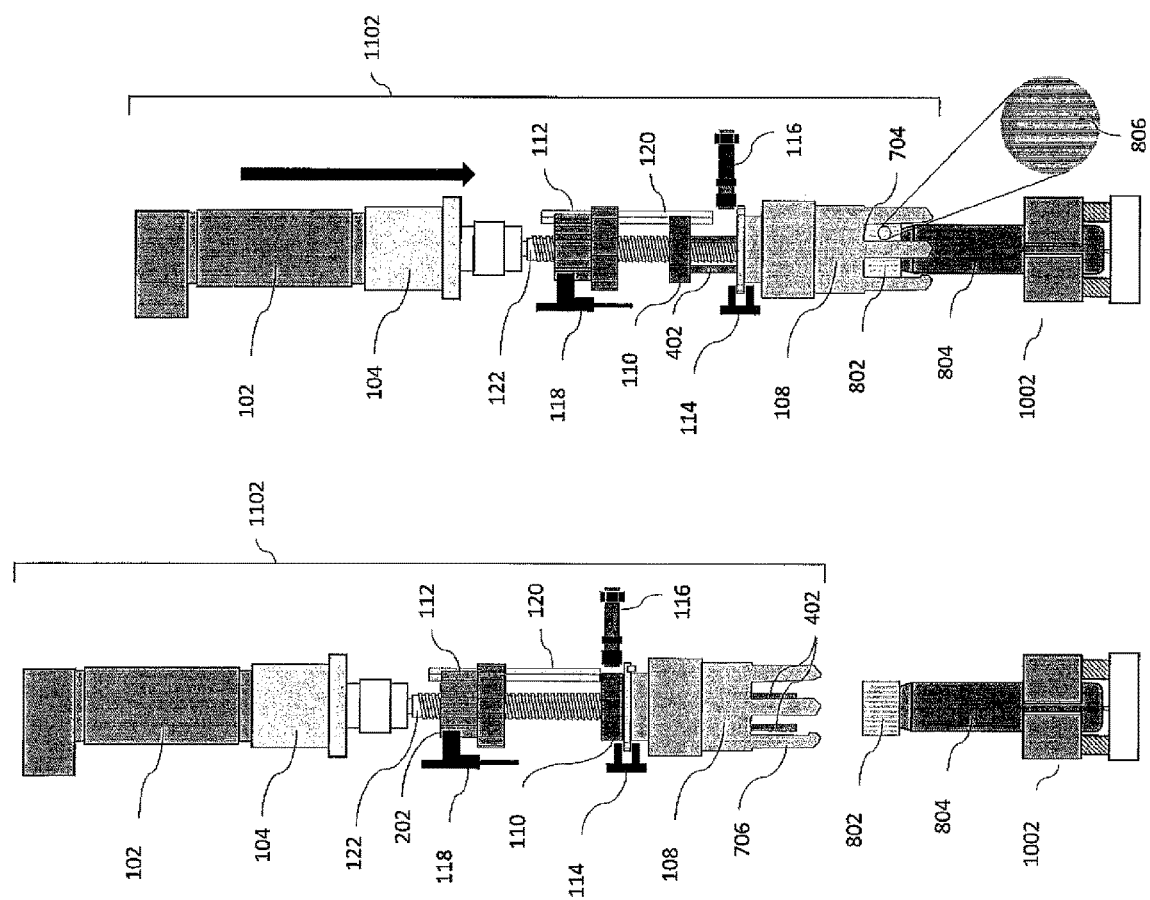

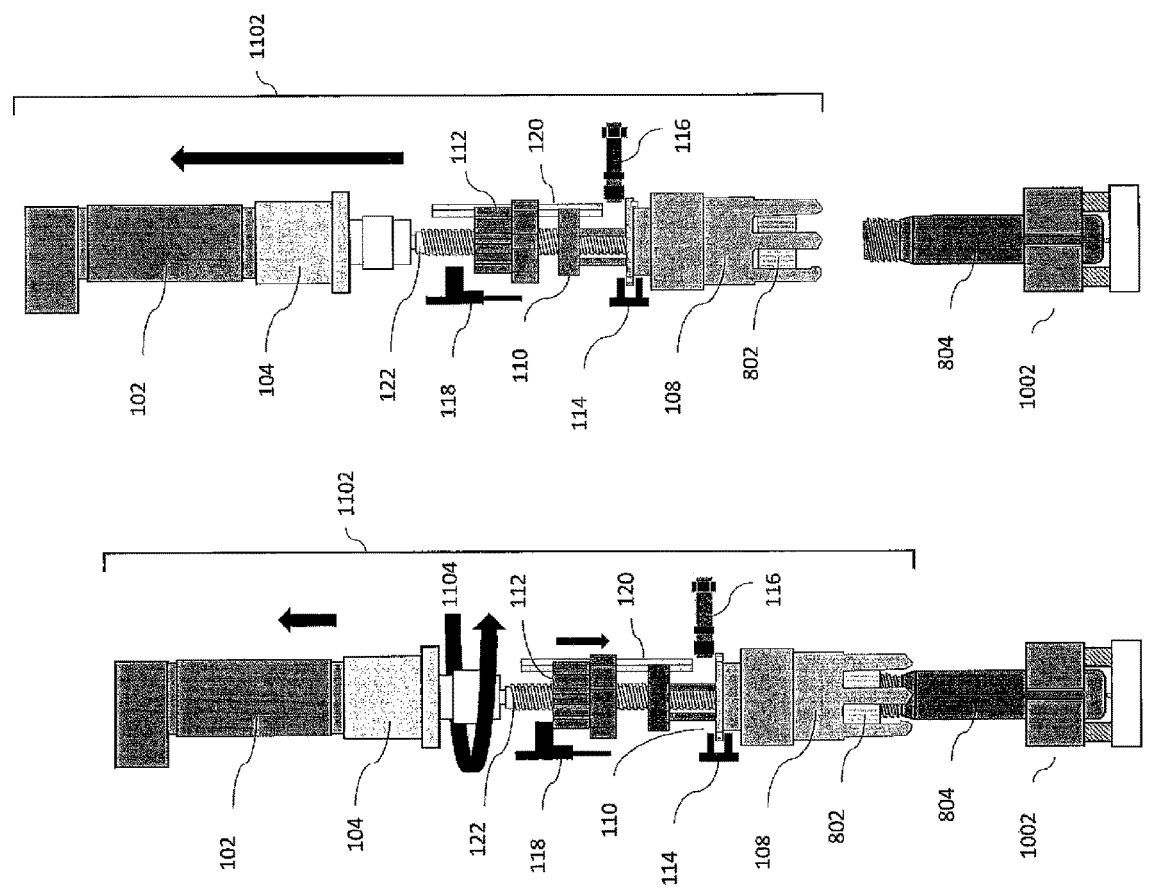

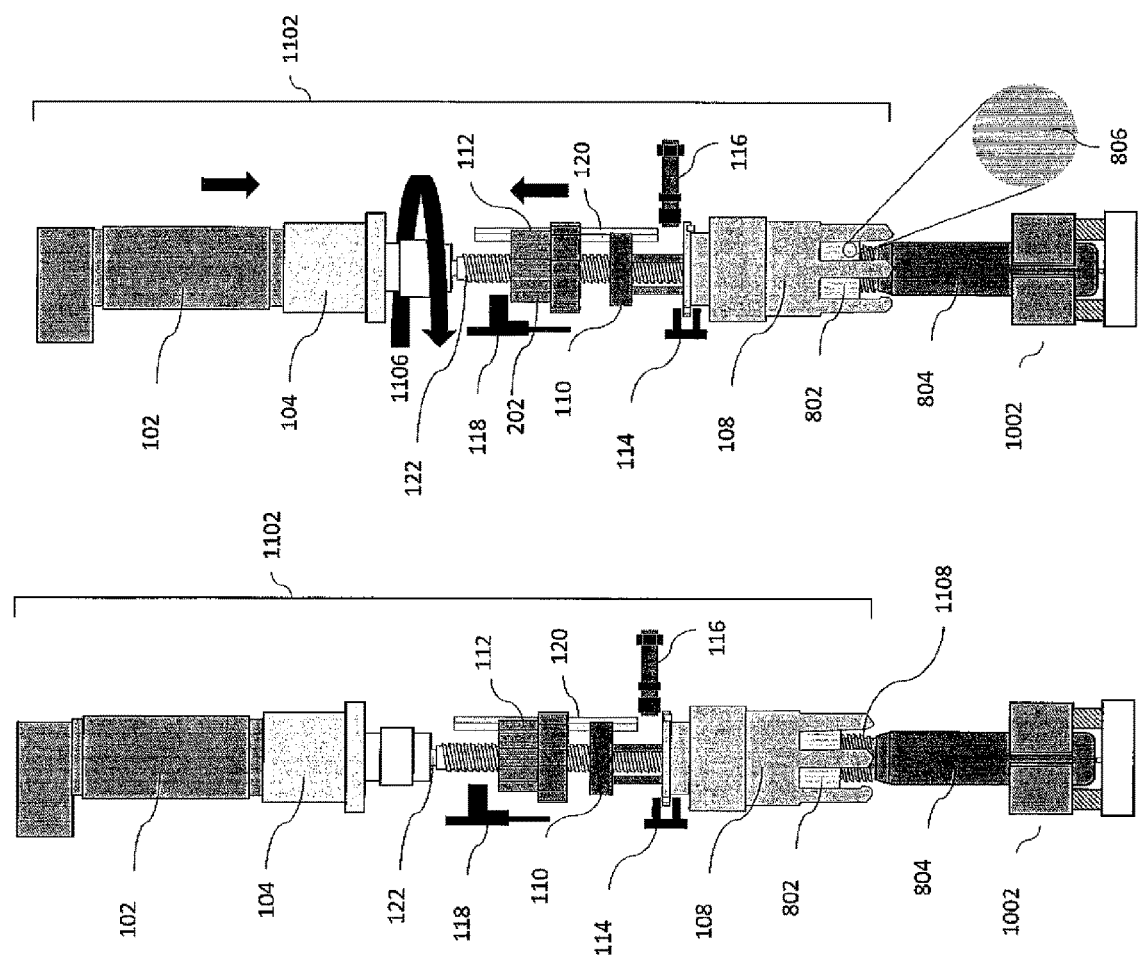

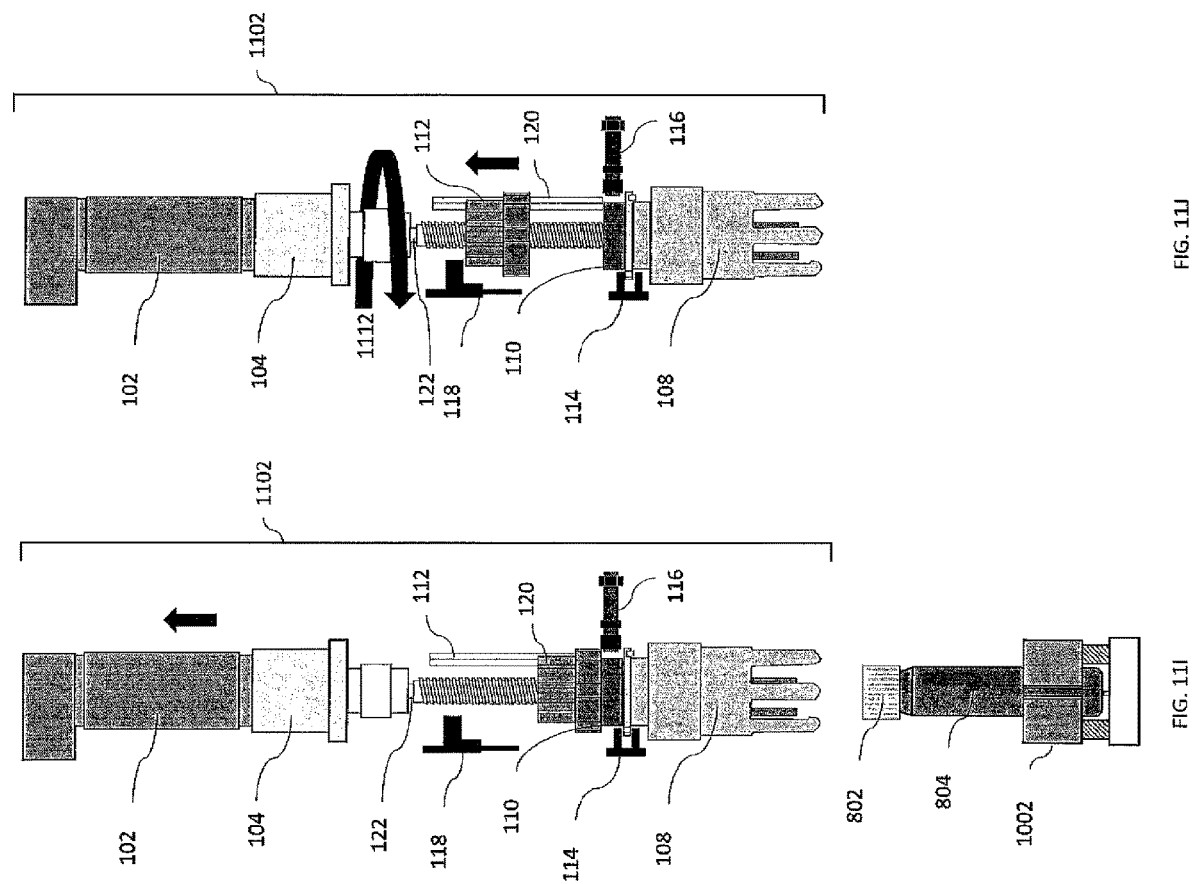

CAPPER/DECAPPER SYSTEM AND METHOD

CROSS-REFERENCE TO RELATED APPLICATIONS

The present application is a national phase entry under 35 U.S.C. § 371 of International Application No. PCT/EP2019/060083, filed Apr. 18, 2019, published as International Publication No. WO 2019/202078 A1, which claims the benefit of the filing date of U.S. Provisional Patent Application No. 62/659,915, filed Apr. 19, 2018, the disclosures of which are hereby incorporated herein by reference.

BACKGROUND OF THE INVENTION

Specimen containers are used in laboratory environments for storing and transporting specimens to be tested. Specimen containers come in a variety of sizes depending on the characteristics or the amount of a specimen needing to be stored or transported. Industry standards may also dictate the type of container to be used for transporting a particular specimen.

Multiple sizes of specimen containers may be delivered to a laboratory for specimen testing. The containers are typically sealed with a screw-on container cap. Consequently, testing specimens is typically a time-consuming and labor-intensive process, requiring removal of the cap, extraction of a specimen sample from the container, and re-installation of the cap. It is therefore desirable to develop a system and method that could be adapted to disparate styles and sizes of specimen containers, perform the operation quickly, and utilize a minimally-complex mechanical arrangement so as to maximize reliability.

Current systems for capping and decapping containers, including containers typically employed in laboratory environments, utilize rotary assemblies which grip either or both of the container body and cap. These systems have employed actuated blades, fingers, cushions, clamps and jaws, actuated electrically, pneumatically or hydraulically to grip an element with enough force and precision so as to be capable of applying a sufficient amount of torque to enable the sealing or unsealing of the container. Such systems typically require complex linkages and control systems in order to provide the requisite gripping force and mechanical dexterity. The complexity of these systems is detrimental to their overall reliability and presents an impediment to quickly adapting the systems to accommodate a variety of container sizes, shapes and styles.

Consequently, there is a need for a mechanically reliable, adaptable system to effectively grip a cap and/or container, apply a specific amount of torque or rotation, and then release the element.

BRIEF SUMMARY OF THE INVENTION

The present disclosure describes a system and method for gripping, torqueing and tightening/releasing an element so as to cap and/or decap a container, such as those typically utilized to carry specimens in laboratory environments. The system is driven by a single bi-directional motor linked to a coupler assembly via a rotating threaded shaft. The coupler assembly is configured to engage with a cap or container via mechanically-biased splines that are actuated without any complex linkages, or operative connection to the motor or other powered components. The system employs an ejector nut and an ejector, both of which are concentrically positioned about the threaded shaft. The ejector nut translates along the shaft as a function of the shaft's rotation, so as to permit the refraction of the ejector when an element is engaged in the coupler assembly, or to cause the ejector to extend into the coupler assembly thereby disengaging the element. The direction and rotation of the motor is controlled by a system coupled to sensors positioned within the system. Such control system may include one or more processors, component interfaces, and data storage/memory. The sensors may include multiple optical, magnetic or mechanical means for monitoring one or more of the positions of the ejector nut and ejector along the threaded shaft and/or the rotational position of the coupler assembly.

The coupler assembly is specific to a particular container or cap configuration. It is designed to mate with a cap or container having a specific radius, and mechanically-biased splines are specifically adapted to mate or engage with surface features of the cap or container or both. Furthermore, because the mechanically biased splines are not operatively connected to the bi-directional motor, or other powered components, the coupling assemblies can be easily connected/disconnected from the system. This permits the system to be quickly adapted to handle new or different cap/container configurations. The system may be employed in a fixed position, with the containers being transported in and out of the coupler assembly by a separate conveyance system. The system may also be positioned upon a movable gantry or articulated armature, enabling it to move relative to the position of a container or separate conveyance system. Therefore, the system and method can either be configured to deliver the capped container to the capper/decapper or deliver the capper/decapper to the capped container.

BRIEF DESCRIPTION OF THE DRAWINGS

The features, aspects, and advantages of the present invention will become better understood with regard to the following description, appended claims, and accompanying drawings in which:

FIG. 4A, is the bottom view of the ejector of the capper/decapper system of FIG. 1B.

FIG. 4B, is the top view of the ejector of the capper/decapper system of FIG. 1B.

FIG. 4C is a side view of the ejector of the capper/decapper system of FIG. 1B.

FIG. 4D is a perspective view of the ejector of the capper/decapper system of FIG. 1B.

FIG. 7A is a side view of the coupler assembly of the capper/decapper system of FIG. 1B.

FIG. 7B is the front view of the coupler assembly of the capper/decapper system of FIG. 1B.

FIG. 8A is a perspective view of the coupler assembly of the capper/decapper system of FIG. 1B positioned over a carrier holding an array of capped containers.

FIG. 8B is a top cross-sectional view of the coupler assembly of FIG. 8A.

FIG. 11A is a side view of the capper/decapper system of FIG. 1B in an initial uncoupled state.

FIG. 11B is a side view of the capper/decapper system of FIG. 1B in an initial coupled state.

FIG. 11C is a side view of the capper/decapper system of FIG. 1B performing a decapping operation.

FIG. 11D is a side view of the capper/decapper system of FIG. 1B in a decapped state.

FIG. 11E is a side view of the capper/decapper system of FIG. 1B positioned to initiate recapping.

FIG. 11F is a side view of the capper/decapper system of FIG. 1B in performing a recapping operation.

FIG. 11I is a side view of the capper/decapper system of FIG. 1B in an ejected state.

FIG. 11J is a side view of the capper/decapper system of FIG. 1B returning to the initial uncoupled state of FIG. 11A.

DETAILED DESCRIPTION

This patent application relates to an apparatus for capping and decapping containers. In particular, this patent application relates to a container capper/decapper that can remove and replace a screw-on container cap.

Figure 1A:
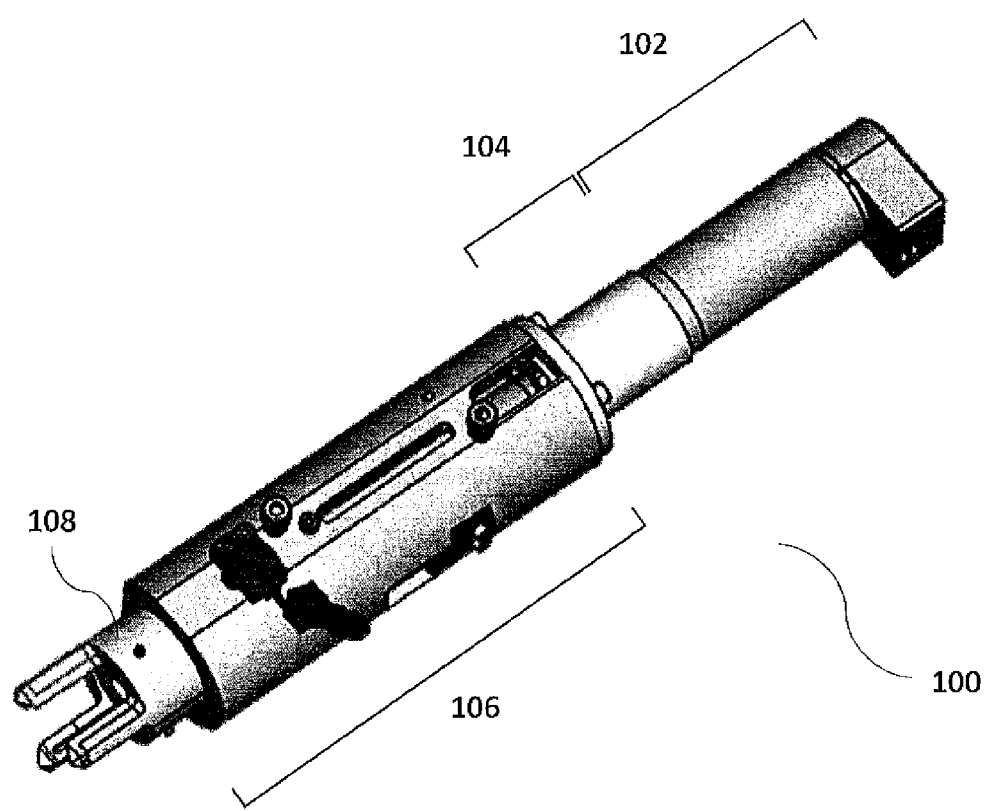
FIG. 1A is perspective view of a capper/decapper system in according to one embodiment of the present disclosure.
Figure 1B:
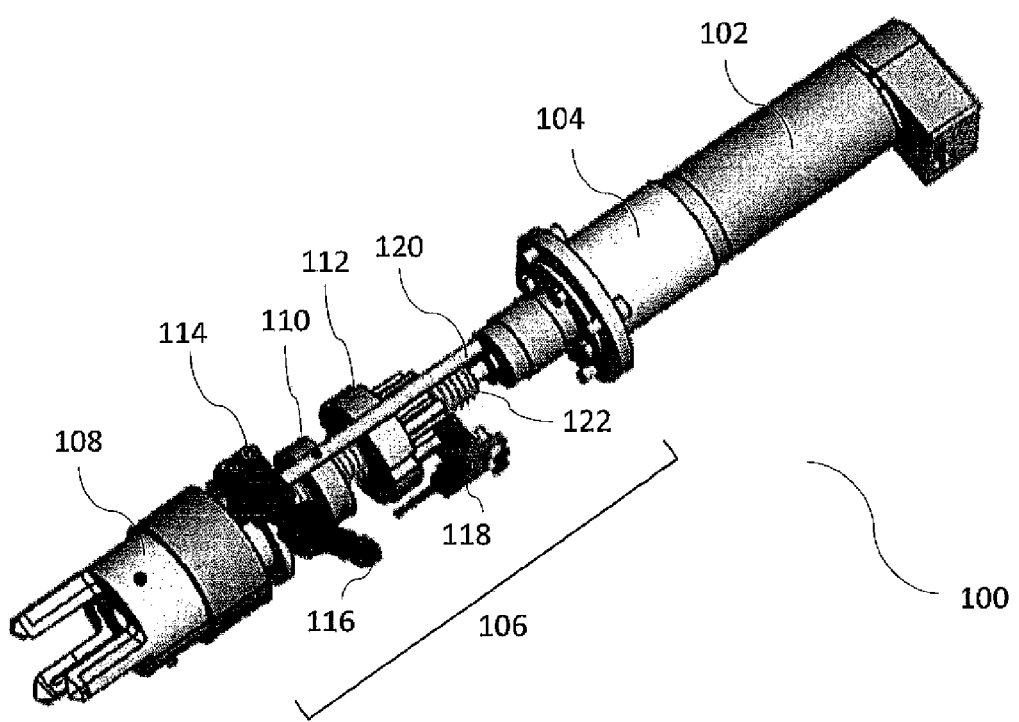
FIG. 1B is perspective view of a capper/decapper system of FIG. 1A depicting the driver mechanism components.
Figure 2A:
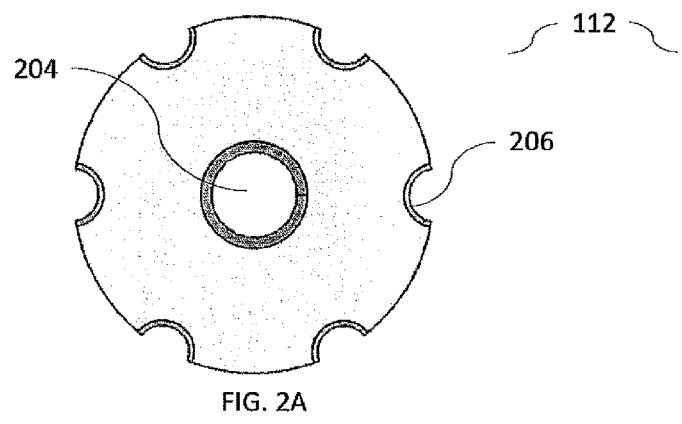
FIG. 2A, is the bottom view of the ejector nut of the capper/decapper system of FIG. 1B.
Figure 2B:
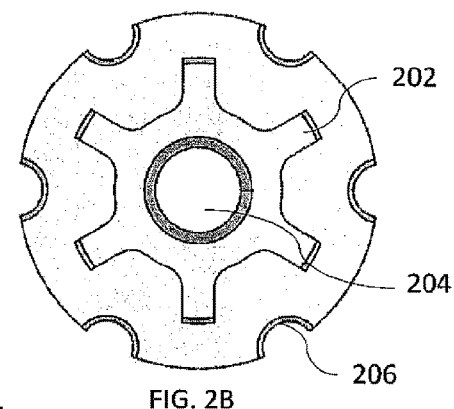
FIG. 2B, is the top view of the ejector nut of the capper/decapper system of FIG. 1B.
Figure 2C:
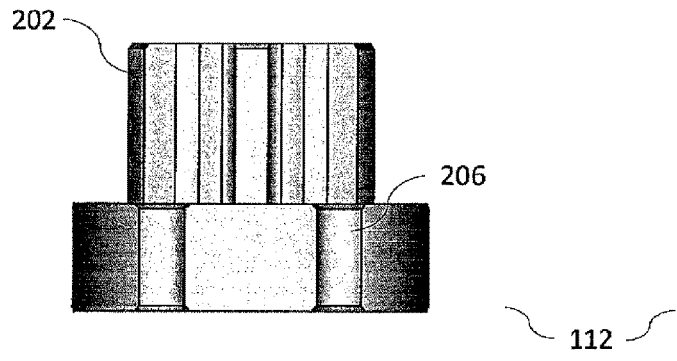
FIG. 2C is a side view of the ejector nut of the capper/decapper system of FIG. 1B.
Figure 2D:
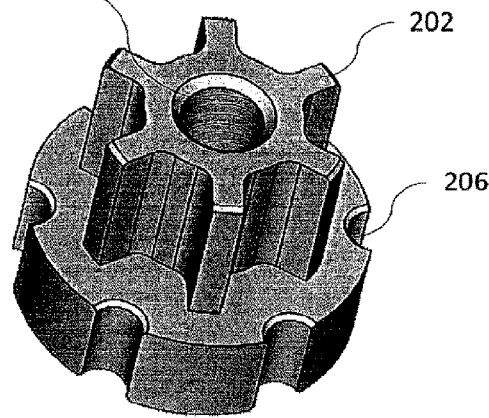
FIG. 2D is a perspective view of the ejector nut of the capper/decapper system of FIG. 1B.

FIGS. 1A and 1B depict an exemplary embodiment of a capper/decapper system according to one embodiment of the present disclosure. As illustrated, the system 100 has four main components: the motor 102, the transmission 104, the driver mechanism 106, and the coupler assembly 108.

The Motor

In an exemplary embodiment, motor 102 is a DC-powered, brushless motor, such as those available Maxon Precision Motors, Falls River, MA. This type of motor offers a high-degree of controllability, when mated with a position controller, such as the EPOS and MAXPOS controllers available from Maxon Precision Motors, Inc. The position controller is interfaced with a capper/decapper control system (not illustrated), that may include one or more processors, component interfaces, and data storage/memory. It will be understood that any suitably controllable drive means could be utilized in place of the DC-powered, brushless motor. This could include other electric motors (stepper, AC-powered, etc.) or pneumatically driven motors.

The Transmission

Motor 102 is shown to be coupled to driver assembly 106 by transmission 106. In one embodiment, transmission 106 is a 1:18 step-down ratio gearbox. This gearing ratio delivers a predetermined torque range and angular-positional accuracy to threaded drive shaft 122 facilitating the capping and uncapping of a particular container type. In a particular embodiment of the invention, the mean torque delivered by the motor is limited to a maximum of 56.8 mNm (millinewton meters). Other gear ratios, including 1:1, or direct drive are contemplated, and selection of a specific gear ratio depends from the particular motor and the types of caps/containers the system is intended to operate with.

The Driver Mechanism

As shown in FIG. 1B, driver mechanism 106 includes ejector 110, ejector nut 112, coupler assembly sensor 114, ejector sensor 116, ejector nut sensor 118, ejector nut alignment shaft 120, and threaded drive shaft 122.

FIGS. 2A, 2B, 2C and 2D provide a bottom, top, side and perspective views, respectively, of ejector nut 112. In one preferred embodiment of the invention, ejector nut 112 is shown to have six blades 202 extending radially from the threaded central channel 204, and six alignment grooves 206 situated around the circumference of ejector nut base 208. Although in this particular embodiment, six top blades and six alignment grooves are shown, only one of each is required for system operation. This feature redundancy is a design choice and simplifies the alignment of the ejector nut during assembly of driver mechanism 106. Threaded central channel 204 is dimensioned to mate with threaded shaft 122.

Figures 3A, 3B:
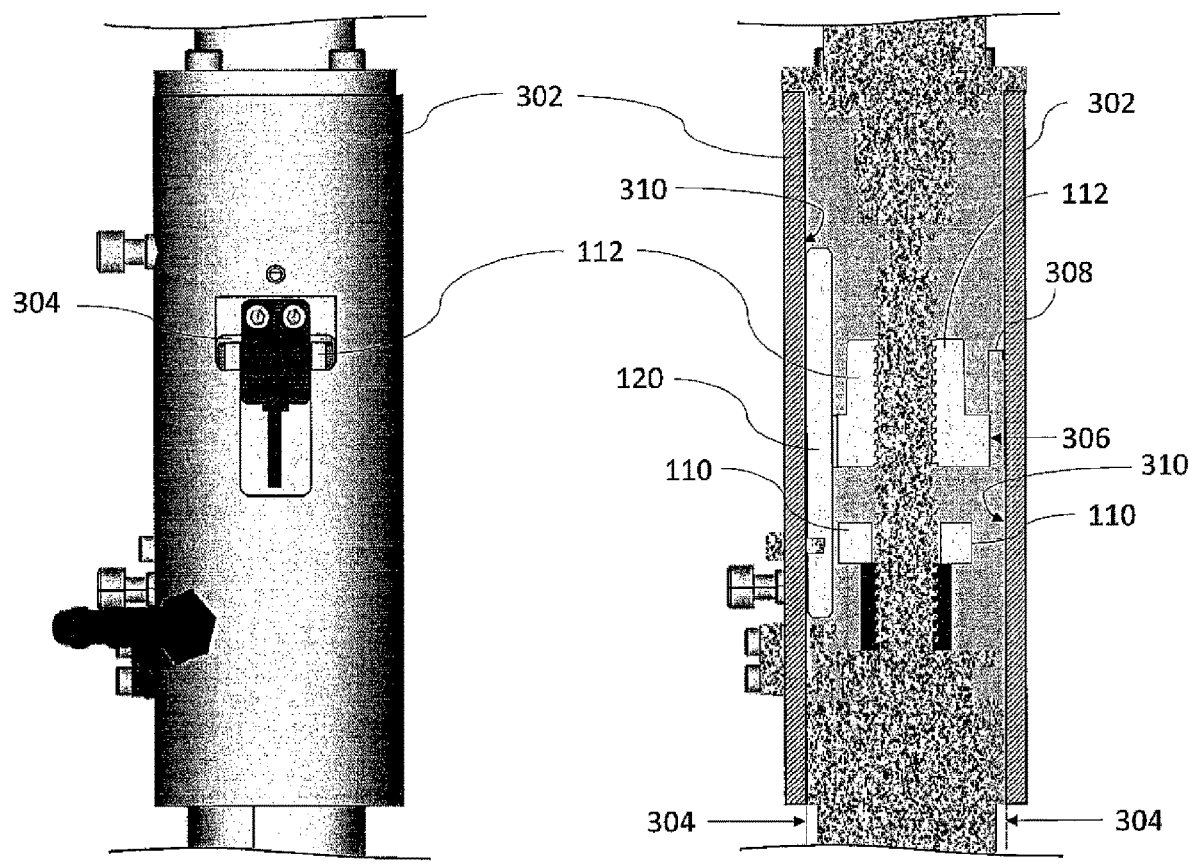
FIG. 3A is a side view of the driver mechanism of the capper/decapper system of FIG. 1B.
FIG. 3B is a partial cross-sectional side view of the driver mechanism of the capper/decapper system of FIG. 1B.
Figure 3C:
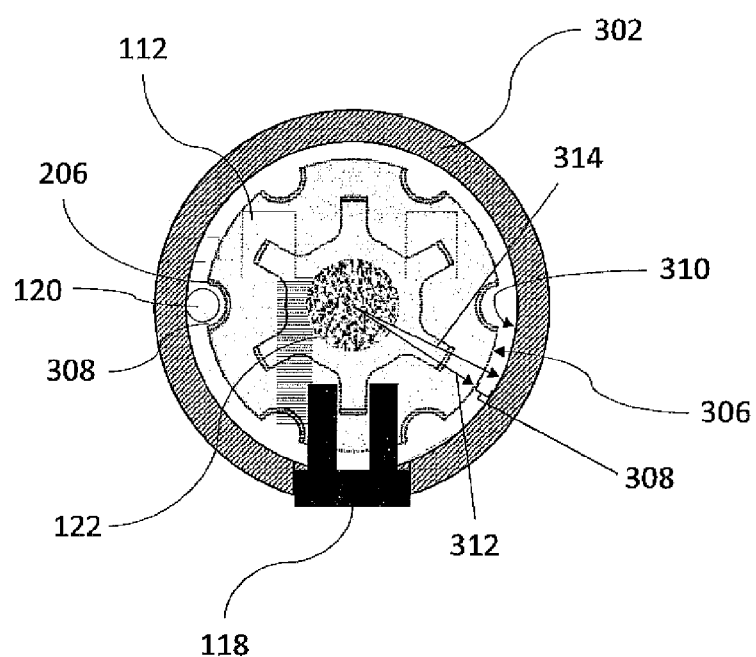
FIG. 3C is a partial cross-sectional top view of the driver mechanism of the capper/decapper system of FIG. 1B.

FIGS. 3A, and 3B show a partial side view, and a partial cross-sectional side view, respectively, of driver mechanism 106. FIG. 3A shows cowling 302 of the driver mechanism. A portion of ejector nut 112 can be viewed through cut-out 304. As illustrated in FIG. 3B, the outermost surface 306 of ejector nut 112 is preferably dimensioned so as to create a gap 308 between it and inner wall 310 of cowling 302. Ejector 110 is shown, in cross-section, positioned below ejector nut 112. This is further illustrated in FIG. 3C, which provides a top cross-sectional view of driver mechanism 106. As illustrated, the outermost radius 312 of ejector nut 112 is less than the inner radius 314 of cowling 302. This creates gap 308 between ejector nut 112 and inner wall 310 of cowling 302. FIG. 3C also illustrates the dimensional relationship between alignment groove 206 and ejector nut alignment shaft 120. Groove 206 is contoured to conform to the shape of ejector nut alignment shaft 120, so as to prevent the rotation of the ejector nut. However, alignment groove 206 is preferably dimensioned so as to allow for a gap 308 between the outer surface of the groove and the outer surface of ejector nut alignment shaft 120. Gap 308 permits ejector nut 112 to translate along threaded shaft 122 as a function of the shaft's rotation (driven by transmission 104), unimpeded by ejector nut alignment shaft 120.

Figure 5:
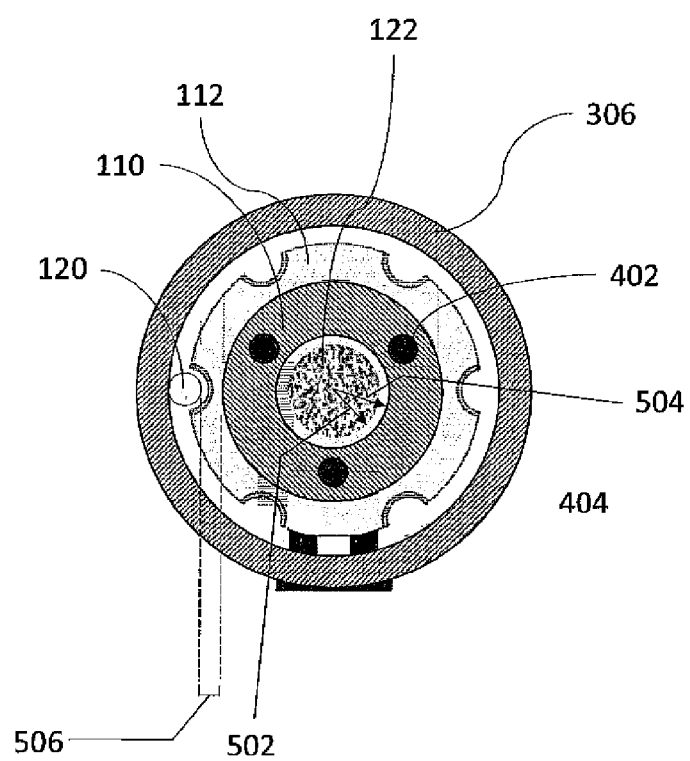
FIG. 5 is a partial cross-sectional bottom view of the driver mechanism of the capper/decapper system of FIG. 1B.

FIGS. 4A, 4B, 4C and 4D provide a bottom, top, side and perspective views, respectively, of ejector 110. In a preferred embodiment of the invention, ejector 110 is shown to have three elongated ejection rods 402 extending from the ejector's bottom surface 403, which has a circular cross-section. Although three such rods are depicted in the figure, the number of rods is a design choice dictated by variables such as the type of element being ejected, as well as material, fabrication and assembly considerations. There is also a central, unthreaded channel 404. As shown in FIG. 5, the radius 302 of unthreaded channel 404 is greater than the outermost radius 504 of unthreaded channel 404. This ensures a gap exists between unthreaded channel 404 and the outermost surface of threaded shaft 122. This gap permits ejector 110 to translate along the longitudinal axis of threaded shaft 122, without being impeded by that shaft. FIG. 5 also shows the dimensional relationship between ejector nut alignment shaft 120 and ejector 110. The outer radius of ejector 110 must be limited to a dimension that ensures a gap 506 between ejector 110 and ejector nut alignment shaft 120, thereby enabling ejector 110 to translate along the longitudinal axis of threaded shaft 122, without impacting or otherwise contacting ejector nut alignment shaft 120.

Figure 6A:
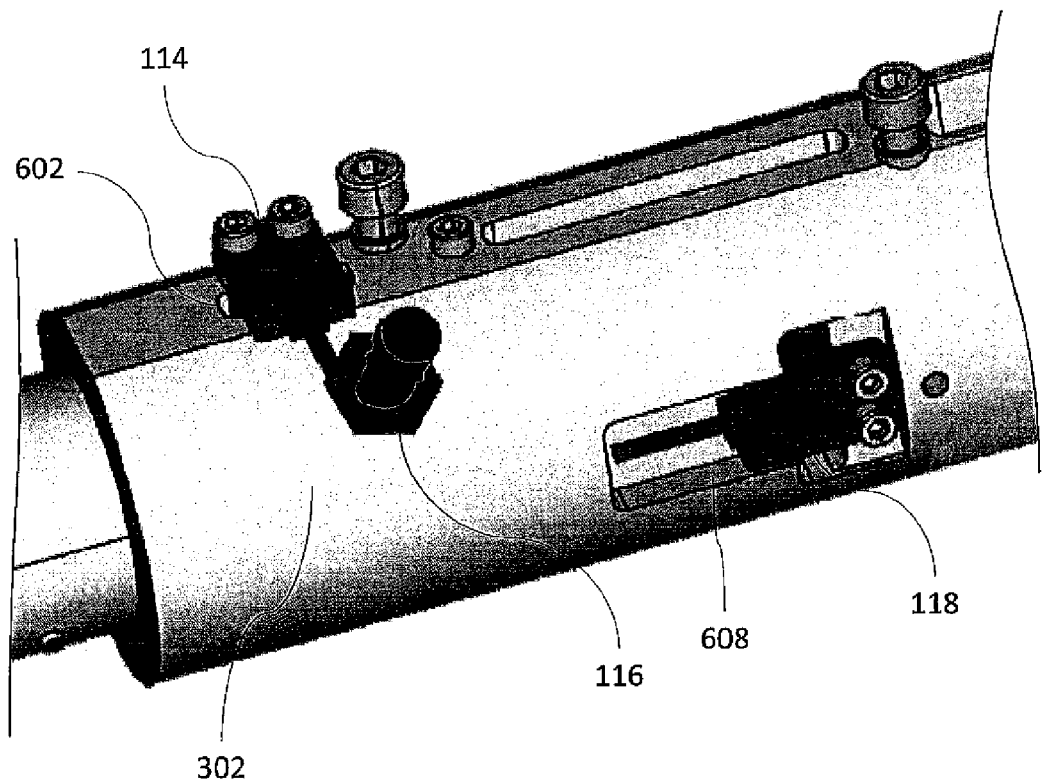
FIG. 6A is a perspective view of a coupler assembly position sensor, an ejector sensor and an ejector nut sensor mounted upon the driver mechanism of FIG. 1B.
Figure 6B:
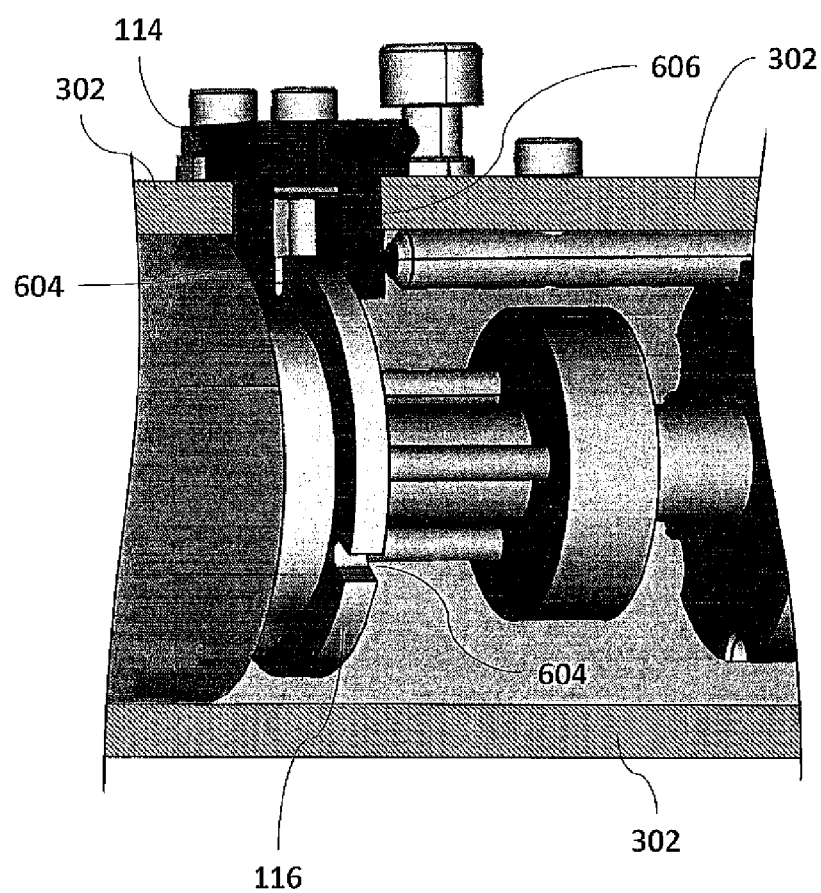
FIG. 6B is a partial cross-sectional perspective view showing the coupler assembly position sensor of FIG. 6A.
Figure 6C:
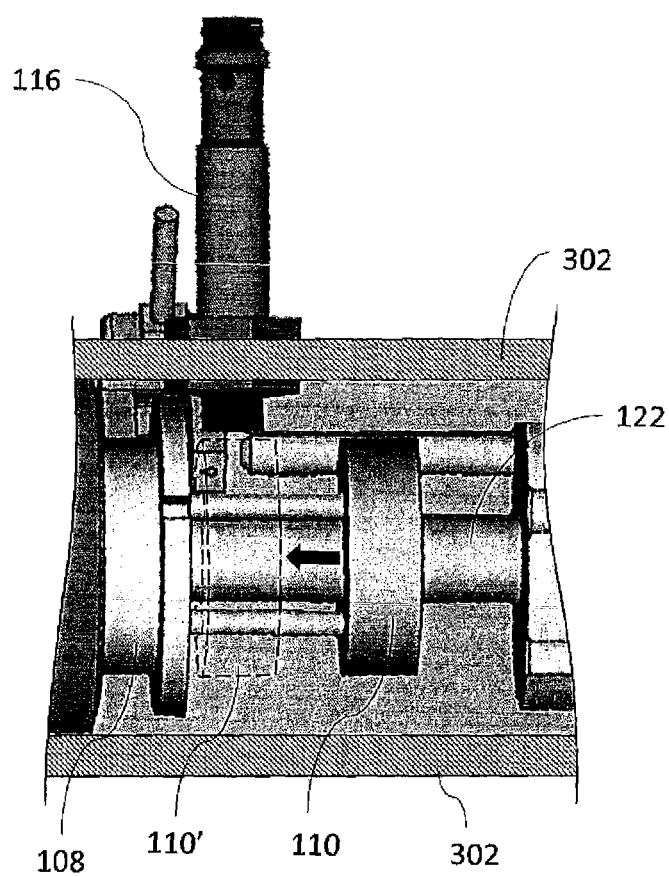
FIG. 6C is a partial cross-sectional perspective view showing the ejector sensor of FIG. 6A.
Figure 6D:
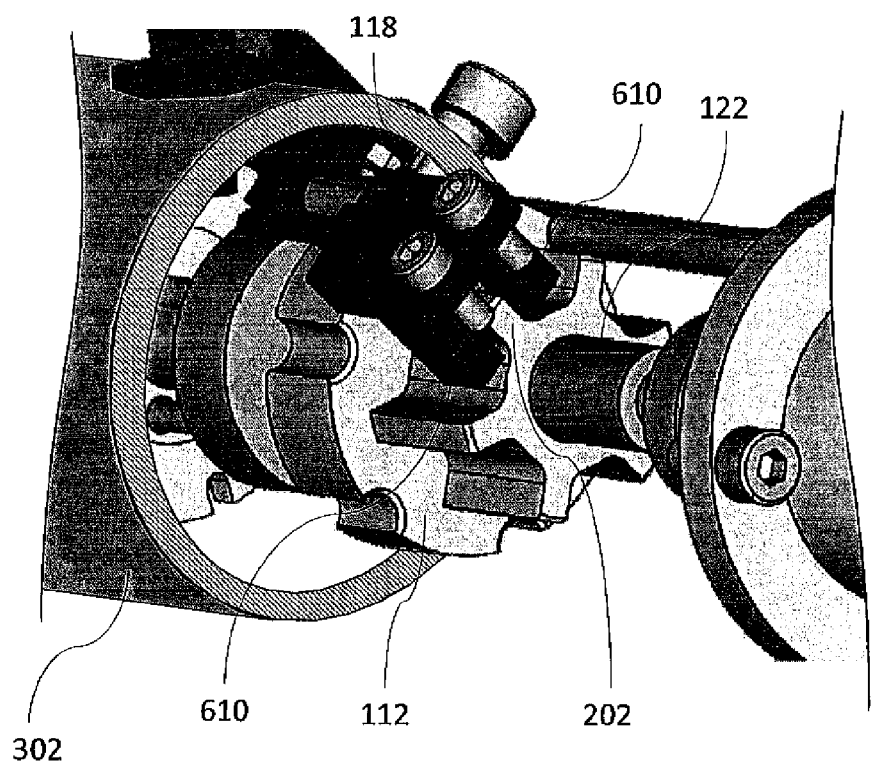
FIG. 6D is a partial cross-sectional perspective view showing the ejector nut sensor of FIG. 6A.

As shown in FIG. 6A, driver mechanism 106 includes three sensors: (i) coupler assembly sensor 114, (ii) ejector sensor 116, and (iii) ejector nut sensor 118. In one example, coupler assembly sensor 114 is an optical fork sensor, mounted upon cowling 302. One example of such a sensor is the PM-Y45-P Compact Photoelectric Sensor manufactured by the Panasonic Industrial Devices Company, a division of the Panasonic Corporation, Osaka, Japan. As shown in FIG. 6A, this sensor is positioned to sense the rotation of coupler assembly 108, via milled window 602. Referring to FIG. 6B, rotation is sensed by detecting radially-equidistant voids or notches 604 in the upper portion of coupler assembly 116 as they pass between the tines 606 of coupler assembly sensor 114. Ejector sensor 116 is an inductive proximity sensor in one example. An example of a commercially available such sensor is a weld-field immune proximity sensor manufactured by Baluff, Inc., Florence, KY. As illustrated in FIG. 6C, sensor 116 is mounted through cowling 302, and positioned to sense when ejector 110 is translated along the longitudinal axis of threaded shaft 122 and brought into close proximity of coupler assembly 108 (position 110'). The third sensor, ejector nut sensor 118, is shown in FIG. 6A mounted upon cowling 302 within milled window 608. In one example, ejector nut sensor 118 is an optical fork sensor of the same type as was specified for coupler assembly sensor 114. As illustrated in FIG. 6D, ejector nut sensor 118 is positioned within the driver mechanism so that when ejector nut 112 is in its uppermost position along threaded shaft 122, blade 202 interrupts the optical signal between tines 610. The output of each sensor is transmitted via an interface to the capper/decapper control system (not illustrated). The information is processed and utilized by the controller system to govern the operation of the capper/decapper. In the above description, each of the sensors was described as being of a particular type (fork, optical, inductive) for purposes of illustration only. However, it will be understood that numerous types of sensors known in the art (e.g., optical, magnetic, inductive, mechanical, sonic, etc.) could be utilized in the capper/decapper described herein, so long as such sensors provide a reasonable means of monitoring the positions of ejector nut 112 and ejector 110 along the threaded shaft, and the rotational position of the coupler assembly 114. Selection of a particular sensor is therefore largely a matter of design choice.

The Coupler Assembly

Figures 7C, 7D:
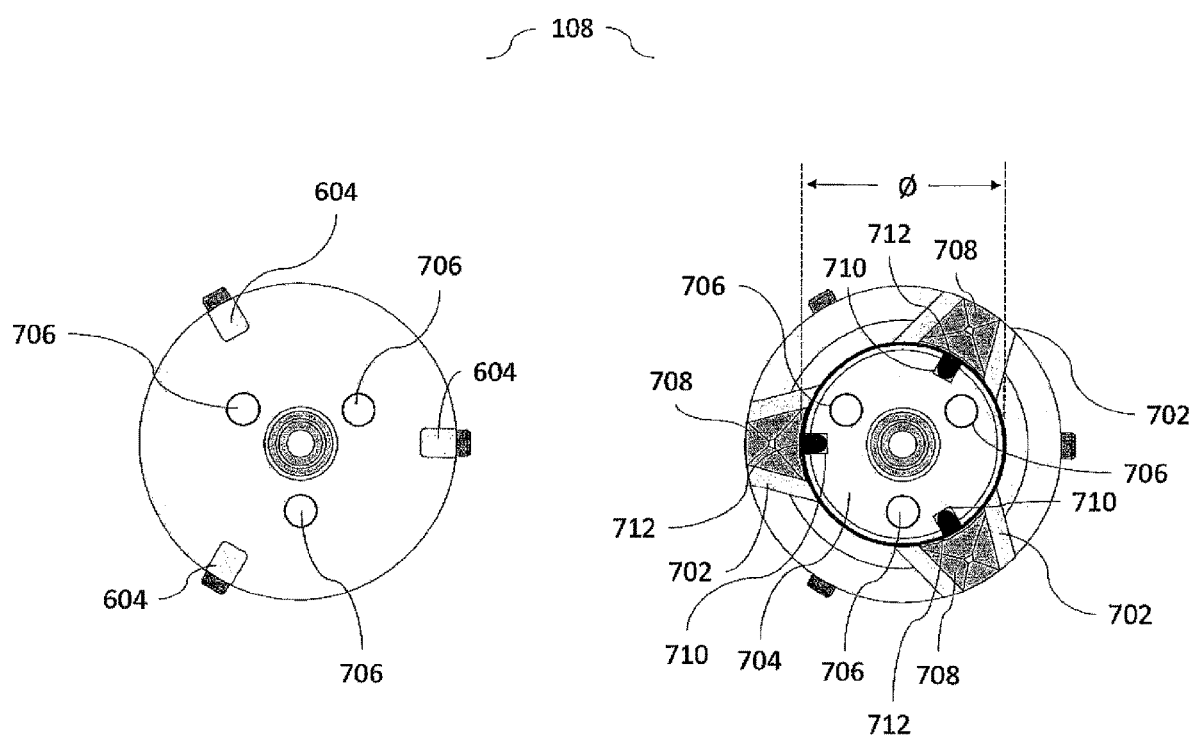
FIG. 7C is the top view of the coupler assembly of the capper/decapper system of FIG. 1B.
FIG. 7D is the bottom view of the coupler assembly of the capper/decapper system of FIG. 1B.

FIGS. 7A and 7B provide a side and front view, respectively, of coupler assembly 108, which is shown to be connected to threaded shaft 122. As shown, in one exemplary embodiment of the coupler three fingers 702 protrude from the bottom of the coupler assembly, and are equidistantly positioned in a circular interior section 704 having a diameter Ø. Other exemplary embodiments of the coupler have as few fingers, or as many as may prove practical for the dimensions of a given coupler assembly 108. In this regard, a larger diameter could accommodate a greater number of fingers. The coupler assembly 108 is also shown to have three circular channels 706. These channels are positioned and dimensioned to permit the three ejection rods 402 of ejector 110 to freely pass through. The specific configuration of the fingers is largely a matter of design choice. In FIG. 7A-7D, each of three fingers 702 is illustrated as having a tapered, trapezoidal cross-section and terminates at a prismatic quadrilateral tip 708. Housed inside a chamber 710 within each finger 702 is an engagement spline 712. As illustrated in FIG. 7C, engagement splines 712 have a circular cross-section in a particular embodiment of this invention. However, the specific geometric configuration of the splines is largely a matter of design choice that will depend upon the particular surface features of the element with which the engagement spline is intended to mate, and various other cross-sectional shapes are contemplated.

The trapezoidal three-fingered configuration is particularly adapted to permit the insertion of the coupler assembly into densely-packed container carriers, as illustrated in FIGS. 8A and 8B. As shown, both the position and the cross-sectional shape of fingers 702 permit them to grasp a particular cap/container without contacting any of the surrounding caps/containers as the elongate fingers 702 fit easily in the interstices between containers in even densely packed arrays. FIG. 8B provides a partial cross-sectional top view of fingers 702 engaging cap 802.

Figure 8C:
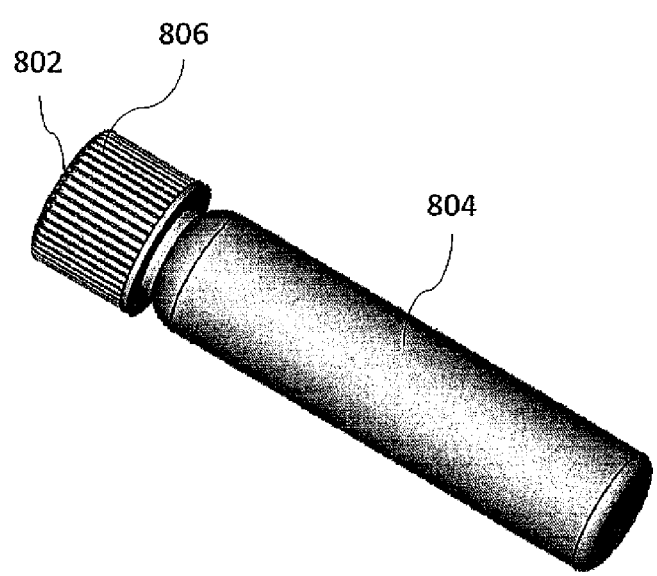
FIG. 8C is a perspective view of an exemplary cap and container.
Figure 8D:
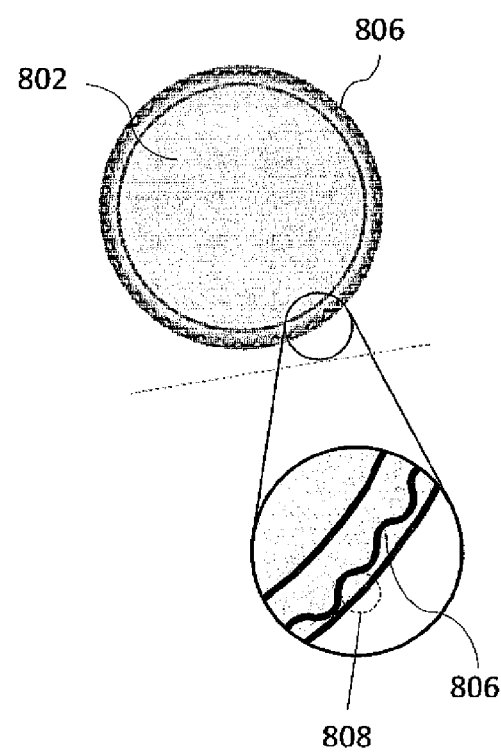
FIG. 8D is a top view of the cap of FIG. 8A.

As previously explained, the capper/decapper described herein is configured to operate on an element, that element being one of a sample container or container cap. An internally-threaded cap 802 is illustrated in FIGS. 8C and 8D. This type of cap is similar to those typically employed on laboratory specimen containers such as the 8 ml Phoenix Broth products manufactured by the Becton Dickinson and Company of Franklin Lakes, NJ. Cap 802 is screwed onto threaded container 804. As shown in FIGS. 8C and 8D, the lateral surface of cap 802 is ringed by longitudinal channels 806, each of which has a substantially circular cross-section 808.

Figure 9A:
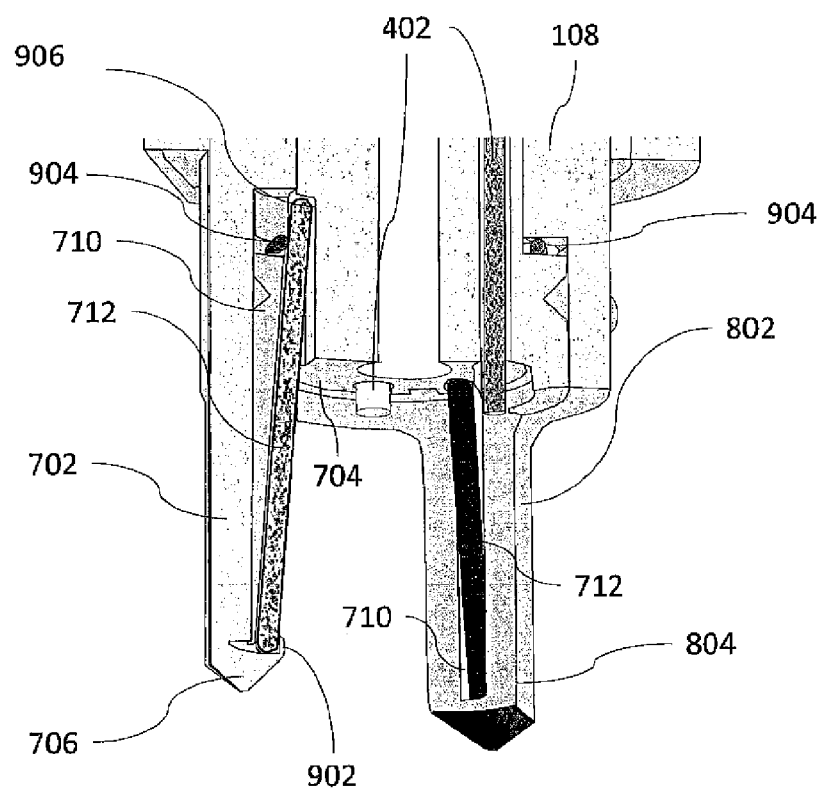
FIG. 9A is a cross-sectional view of the coupler of FIG. 6A.
Figure 9B:
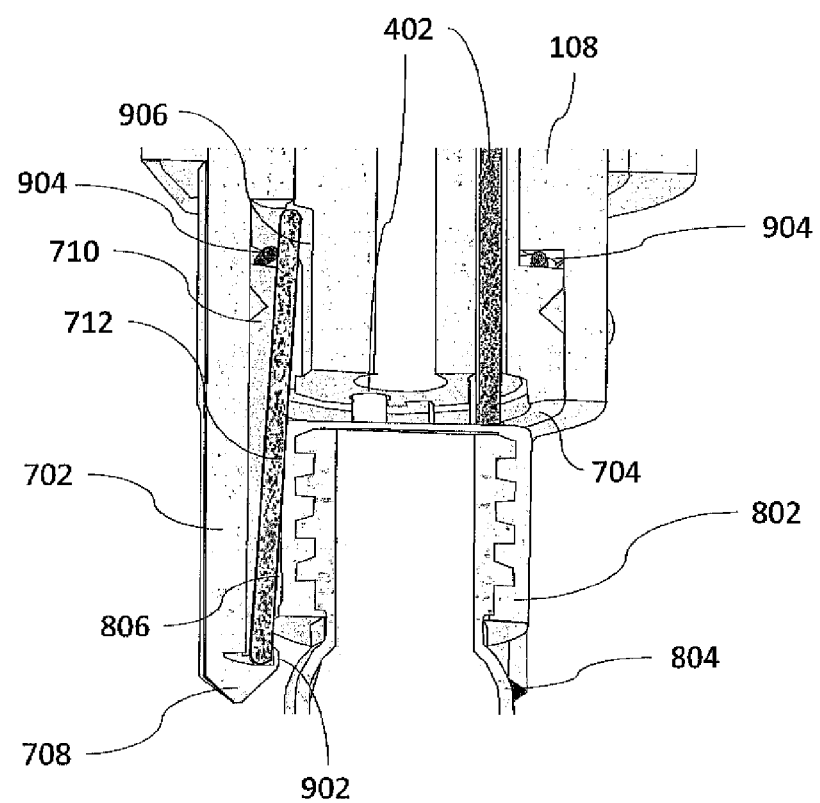
FIG. 9B is a cross-sectional view of the coupler of FIG. 6A and the cap and container of FIG. 8A.

FIG. 9A provides a cross-sectional view of the splines and coupler assembly 108. FIG. 9B provides a cross-section view of coupler assembly 108 engaging cap 802. The base of engagement spline 712 is shown to be retained by vertical lip 902 within prismatic quadrilateral tip 708 of finger 702. The top of engagement spline 712 is biased by circular spring 904, urging the upper portion of spline inward and against wall 906 of chamber 710. FIG. 9B is a cross-section view of coupler assembly 108, but with cap 802 fully inserted between fingers 702. As shown, engagement spline 712 is securely mated with longitudinal channel 806. Circular spring 904 has been deformed outward by the upper portion of spline 712, which is been pushed away from wall 906 of chamber 710 as a consequence of the insertion of cap 802. The mating between the engagement splines 712 and the longitudinal channels 806 provides a secure interface enabling a significant torque to be applied to cap 802 by coupler assembly 108 as threaded shaft 122 is rotated in either a clockwise or counter-clockwise direction. All references to clockwise or counter-clockwise are from a reference point looking down onto the top of capper/decapper system.

As illustrated in FIG. 9B, cap 802 fits securely between the fingers 702 of upon insertion into coupler assembly 108. To ensure this secure fit, and the resultant mating of the engagement splines 712, coupler assembly 108 must be designed with a cap-specific diameter, Ø (see FIG. 7D). A cap of a particular diameter requires a similarly dimensioned coupler assembly to be connected to the driver mechanism and threaded shaft.

Container Support

Figure 10A:
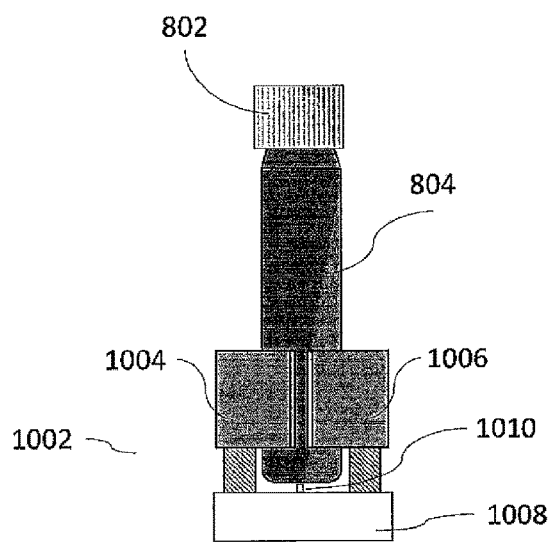
FIG. 10A is a side view of a container holder in a first state.
Figure 10C:
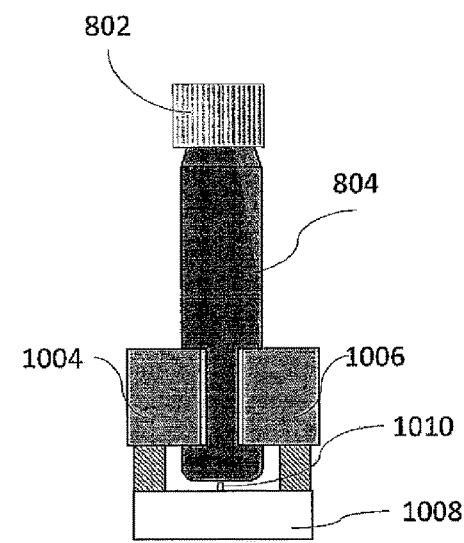
FIG. 10C is a side view of the container holder of FIG. 10A in a second state.
Figure 10B:
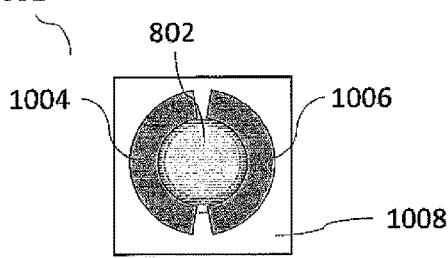
FIG. 10B is a top view of the container holder of FIG. 10A.
Figure 10D:
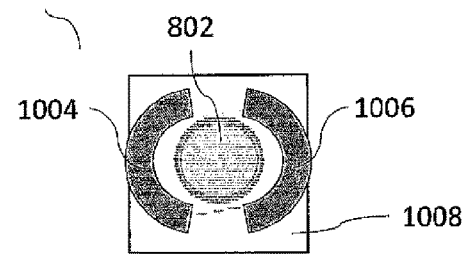
FIG. 10D is a top view of the container holder of FIG. 10C.

For purposes of illustrating additional elements that will work in cooperation with the capper/decapper, the capper/decapper is described herein operating upon a capped container 804, such as the one depicted in FIGS. 8A-8D. This operation requires that container be supported during the uncapping and capping processes. The particular means for providing this support is tangential to the capper/decapper described herein. The capper/decapper described herein is configured to work with a variety of holders, as long as such holders do not hinder proper placement of the capper/decapper on the capped container. One illustration of a container holder 1002 is provided in FIGS. 10A and 10B. Holder 1002 is a representation of a holder that may be positioned in at least two states. FIG. 10A depicts the holder in a gripping state, wherein movable restraints 1004 and 1006, supported by base 1008, are held in contact with the exterior of a container 804. The force exerted upon container 804 by these restraints is greater than the amount of torque required to be exerted upon cap 802 during a capping and/or decapping operation. FIG. 10B depicts the holder in a retracted state, wherein restraints 1004 and 1006 are pulled away from the exterior of a container 804. Thereby allowing the container, supported by spindle 1010, to rotate freely about its longitudinal axis upon application of a sufficient rotational torque.

Capper/Decapper Operation

Figure 11H:
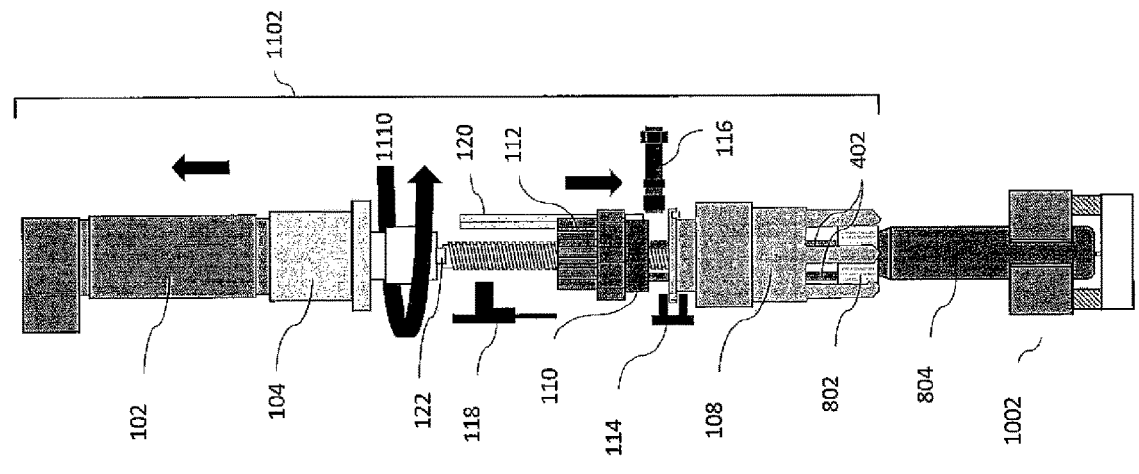
FIG. 11H is a side view of the capper/decapper system of FIG. 1B in performing an ejection.

FIG. 11A depicts capper/decapper 1102 positioned above cap 802 of container 804. It should be understood that capper/decapper 1102 can be affixed to a robotic or computer-controlled gantry or armature (not illustrated), enabling it to move, with at least one degree of freedom, relative to the position of a separate conveyance or support system for one or more containers. One such support system is holder 1002, which is shown to be in a gripping state supporting container 804. Capper/Decapper 1102 is in an initial state for commencing a decapping operation. In this state, ejector nut 112 is in an uppermost position along the axis of threaded shaft 122. In this position, blade 202 interrupts the optical signal between the tines of ejector nut sensor 118. The output of sensor 118 is transmitted via an interface to a capper/decapper control system (not illustrated) confirming the ejector nut positioning. Ejector 110 is in its lowermost position along the axis of threaded shaft 122, resting upon the upper surface of coupler assembly 108. The ejection rods 402 are fully extended, protruding through the circular channels 706 of coupler assembly 108. Ejector sensor 116 detects this initial position of ejector 110, and transmits a signal confirming such position to the capper/decapper control system. Coupler assembly 110 is positioned concentrically above cap 802. The rotational position of coupler 108, as recognized by coupler assembly sensor 114, may be adjusted via actuation of motor 102 to rotate threaded shaft 122 while the capper/decapper is in this initial state. This could be done, for example, to position fingers 708 so that they do not obscure any labeling upon the exterior of container 804. The minimal rotational adjustment required to accomplish this (less than a 60° shift given the three-fingered configuration of coupler assembly 108), does not require any significant movement of ejector nut 112 along the axis of threaded shaft 122. Consequently, blade 202 continues to interrupt the optical signal between the tines of ejector nut sensor 118.

As shown in FIG. 11B, the next phase of the decapping operation requires capper/decapper 1102 to be moved downward so as to cause circular interior section 704 of coupler assembly 108 to come into direct contact with the top surface of cap 802. Positioning capper/decapper 1102 in this manner causes the top of cap 802 to contact and push upward upon the lower surfaces of fingers 708, and thereby push ejector 110 upward along the axis of threaded shaft 122, and away from the proximity of ejector sensor 116. In addition, as cap 802 is brought into contact with coupler assembly 108, the engagement splines 712 mate with the longitudinal channels 806 of the cap 802. This provides a secure interface enabling a significant torque to be applied to cap 802 by coupler assembly 108. The position of ejector nut 112 remains unchanged for the initial state.

A predetermined counter-clockwise torque 1104 is then applied to threaded shaft 122 via actuation of motor 102 by the capper/decapper control system (see FIG. 11C). In a preferred embodiment, the system applies this torque by actuating motor 102 to cause transmission 104 to rotate threaded shaft 122 through a specific angular rotation. This rotation is predetermined based upon the amount of rotation that is required to remove cap 802 from container 804. As threaded shaft 122 rotates counter-clockwise, cap 802 is translated upwards. The aforementioned robotic or computer-controlled gantry or armature is programmed to raise capper/decapper 1012 a predetermined distance at a predetermined rate so as to compensate for upward translation. Systems providing such controlled mechanical manipulation are well-known in the art and will not be discussed here. The system will not initiate application of counter-clockwise torque 1104 unless sensors 114, 116 and 118 provide signals indicative of the proper positioning of ejector nut 112, coupling assembly 108 and ejector 110, respectively. Failing the provision of such, the capper/decapper control system will default to an error-mode or actuate motor 102 and/or the aforementioned robotic or computer-controlled gantry or armature to bring the capper/decapper into a proper state of compliance. The operator can determine the default state of the capper/decapper in response to a signal from the sensors that the capper/decapper is not in the proper position for the capping/decapping operation.

Once cap 802 has been fully removed, capper/decapper 1102 can be moved clear of container 804 under control of the capper/decapper control system (see FIG. 11D). This permits container 804 to be moved or otherwise processed.

To begin the recapping process, capper/decapper 1102 is moved so that coupler assembly 110 is positioned concentrically above container 804 and lowered so that the internal threading of cap 802 comes into contact with the threads 1108 on container 804 (FIG. 11E).

As shown in FIG. 11F, a predetermined clockwise torque 1106 is applied to threaded shaft 122 via actuation of motor 102 by the capper/decapper control system. In a preferred embodiment, the system applies this torque by actuating motor 102 to cause transmission 104 to rotate threaded shaft 122 through a specific angular rotation. This rotation is predetermined based upon the amount of rotation is will require to tighten cap 802 onto container 804. This rotation also causes ejector nut 112 to translate upwards along the axis if threaded shaft 122. In a preferred embodiment of the invention this translation is not sufficient enough to cause blade 202 to interrupt the optical signal between the tines of ejector nut sensor 118. As threaded shaft 122 rotates clockwise, cap 802 is translated downwards, and capper/decapper controller lowers capper/decapper 1012 at a predetermined rate so as to compensate. In one embodiment of the invention, the system does not initiate application of clockwise torque 1104 unless sensors 114, 116 and 118 had provided signals indicative of the proper positioning of ejector nut 112, coupler assembly 108 and ejector 110, respectively. Failing the provision of such, the capper/decapper control system as described defaults to an error-mode or actuates motor 102 and/or the aforementioned robotic or computer-controlled gantry or armature to bring the capper/decapper into a proper state of compliance.

Figure 11G:
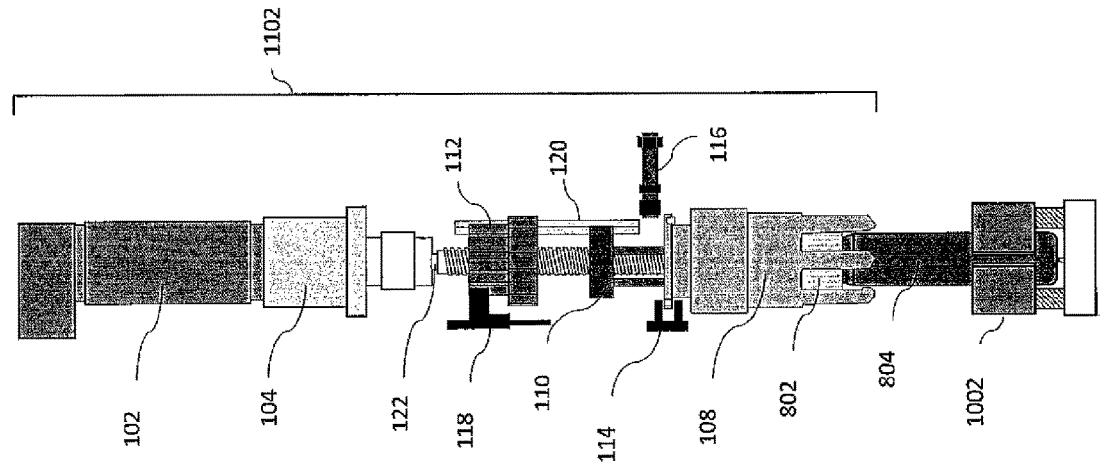
FIG. 11G is a side view of the capper/decapper system of FIG. 1B in a recapped state.

Once cap 802 has been fully tightened onto container 804 (see FIG. 11G), ejector nut 112 is in a position partially translated down the axis of threaded shaft 122. However, this translation is not of such an extent that the bottom of ejector nut 112 comes into contact with the top surface of coupler assembly 108. The capper/decapper is configured to prevent such contact, as such contact could result in the premature ejection of cap 802. Unwanted contact is avoided by selecting the length of threaded shaft 122, the spacing of the threads upon that shaft, and/or the horizontal dimensions of ejector nut 112 and/or ejector 110.

To cause the ejection of now tightened cap 802/container 804, threaded shaft 122 must be rotated in a counter-clockwise direction. During this counter-clockwise rotation in cap 802, the cap channels 806 are still securely mated with engagement splines 712 of coupler assembly 108. The application of the counter-clockwise force will cause the cap to be unscrewed from container 804 in the container remains secure from rotating with the cap 802 at this point. To avoid this undesirable result, holder 1002 is first placed into a retracted state, so that the cap 802/container 804 assembly is free to rotate about its longitudinal axis upon application of a rotational torque. Shaft 122 is then rotated counter-clockwise (1110) via actuation of motor 102 by the capper/decapper control system (see FIG. 11H). In a preferred embodiment, the system rotates shaft 122 until ejector nut 112 is driven downward to a point along the axis of threaded shaft 122 that causes it to contact the top of ejector 110 and push ejector 110 down into position adjacent to ejector sensor 116. The rotation of the threaded shaft 122 is stopped in response to a signal received by the capper/decapper system controller from ejector sensor 116 indicative of ejector being in the proximity of that sensor. However, this rotation could also be stopped after a predetermined number of rotations based upon the amount of previous clockwise and counter-clockwise rotation the shaft had been subjected to since ejector nut 112 left its initial position. As ejector 110 is pushed down, ejection rods 402 protrude downward through channels 706 in coupler assembly 108, exerting a downward force upon cap 802. This force disengages the cap from the engagement splines 712. Prior to disengagement, cap 802/container 804 is rotated counter-clockwise by coupler assembly 108. As the threaded shaft 122 is rotated, ejector nut 112 is lowered.

Figure 11K:
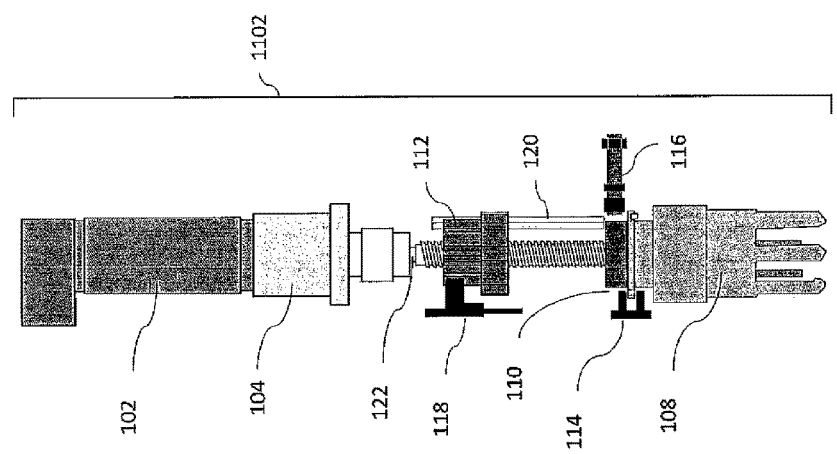
FIG. 11K is a side view of the capper/decapper system of FIG. 1B in the initial uncoupled state of FIG. 11A.

Capper/decapper 1102, now fully disengaged from cap 802/container 804, is then returned to its initial state in order to begin another capping/decapping cycle. As shown in FIG. 11J, to accomplish this, the system rotates shaft 122 in a clockwise direction 1112 until ejector nut 112 moves upward to a point along the axis of threaded shaft 122 that causes blade 202 to interrupt the optical signal between the tines of ejector nut sensor 118. This rotation of threaded shaft 122 is stopped in response to a signal received by the capper/decapper system controller from ejector nut sensor 116 indicative the ejector nut being back in its initial position (see FIG. 11K).

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. An apparatus for imparting rotational torque upon a substantially cylindrical object, comprising:
   a coupling assembly having a substantially circular surface having a diameter approximately equal to that of the substantially cylindrical object wherein the coupling is adapted to receive the substantially cylindrical object; and
   a plurality of fingers extending from the substantially circular surface wherein a proximate end of each finger is attached to the coupling and a distal end extends away from the coupling;
   wherein each finger includes a spline at least partially recessed within a chamber therein, wherein a first end of the spline is pivotally retained in the distal end of each finger, and a second end of the spline adjacent the coupling is biased so that the second end is urged outward from the finger that retains spline; and
   wherein each spline is adapted to grip a surface of the substantially cylindrical object, when the substantially cylindrical object is received between the fingers so that rotation of the coupling causes rotation of the substantially cylindrical object.

2. The apparatus of claim 1, further comprising:
   a plurality of rods, each rod having a first end and a second end, and positioned to pass through a channel in the coupling assembly so that the first end of each rod is in position to contact a first face of the substantially cylindrical object; and
   an ejector nut capable of being actuated so as to urge the plurality of rods through the respective channels so that the first end of each of the plurality of rods move the substantially cylindrical object in a direction away from the substantially circular surface, and thereby disengage the substantially cylindrical object from the splines.

3. The apparatus of claim 1, wherein a driving means rotates the coupling assembly about the center of the substantially circular surface, causing the fingers to orbit about that center, and the splines to impart a rotational torque upon the substantially cylindrical object.

4. The apparatus of claim 3 wherein the driving means is a central shaft.

5. The apparatus of claim 4 wherein the central shaft is threaded.

6. The apparatus of claim 4 further comprising:
an ejector assembly comprising a first side and second side, wherein the second end of each rod is connected to a first side of a support platform such that an ejector nut operates on the second side of the ejector to move the plurality of rods substantially simultaneously.

7. The apparatus of claim 6 wherein:
the ejector assembly has a circular cross-section and an unthreaded channel through which a threaded shaft extends and is concentrically positioned with respect to the substantially circular surface, and adapted to travel along a longitudinal axis of the threaded shaft independent of rotation of that shaft; and
the ejector nut has a circular cross-section and is concentrically located with respect to the substantially circular surface and is adapted to travel along the longitudinal axis of the threaded shaft as a function of the rotation of that shaft.

8. The apparatus of claim 7 further comprising a sensor adapted to detect the position of the ejector nut along the longitudinal axis of the threaded shaft.

9. The apparatus of claim 7 further comprising a sensor adapted to detect the position of the platform along the longitudinal axis of the threaded shaft.

10. The apparatus of claim 7 further comprising a sensor adapted to detect the rotational position of the platform along the longitudinal axis of the threaded shaft.

11. The apparatus of claim 4 wherein the shaft is connected to a bi-directional servo motor.

12. The apparatus of claim 3 further comprising a sensor to detect the rotational position of the coupling assembly.

13. The apparatus of claim 1, wherein each spline has one of a circular cross-section, a triangular cross-section, or a rectangular cross-section.

14. The apparatus of claim 1, wherein each spline is biased by a single circular spring, concentric with the substantially circular surface, and in contact with the second end of each spline.

15. The apparatus of claim 1, wherein each spline is biased by an individual spring in contact with the second end of each spline.

16. The apparatus of claim 1, wherein the plurality of fingers comprises at least three fingers.

17. The apparatus of claim 1, wherein each finger has a trapezoidal cross-section.

18. The apparatus of claim 1, wherein a portion of each spline is housed within a chamber located within a finger.

19. The apparatus of claim 1, wherein the substantially cylindrical object is a screw cap for a container.

20. The apparatus of claim 1, wherein the substantially cylindrical object is a container having a screw cap.

21. A method for imparting rotational torque upon a substantially cylindrical object, comprising:

coupling an assembly having a substantially circular surface, with a diameter approximately equal to that of the substantially cylindrical object, to a substantially cylindrical object;
the assembly comprising a plurality of fingers extending from the substantially circular surface, positioned about a circumference of said substantially circular surface, each finger of the plurality of fingers having at least one surface that is substantially tangential to the circumference of the substantially circular surface;
wherein each finger of the plurality of fingers includes a biased spline having a first end pivotally retained in a chamber in a tip of each finger, biased so that a second end of each spline is urged away from the finger in which it is retained;
securing each spline to a surface of the substantially cylindrical object; and
rotating the assembly about the center of the substantially circular surface, thereby rotating the plurality of fingers about that center; and
thereby imparting a rotational torque upon the substantially cylindrical object via the interface between each spline and the surface of the substantially cylindrical object.

22. The method of claim 21, further comprising:
actuating an ejector nut to urge each of a plurality of rods through a channel in the assembly so that an end of each rod contacts the first face of the substantially cylindrical object urging it away from the substantially circular surface; and
disengaging each spline from securement with the surface of the substantially cylindrical object.

23. The method of claim 22 wherein the step of actuating the ejector nut comprises: rotating a threaded shaft, the threads of which are engaged with the ejector nut, so that the ejector nut is translated along a longitudinal axis of the threaded shaft.

24. The method of claim 23 wherein the step of actuating the ejector nut is initiated in response to a signal received from a sensor monitoring the position of the ejector nut along the longitudinal axis of the threaded shaft.

25. The method of claim 23 wherein the step of actuating the ejector nut is initiated in response to a signal received from a sensor monitoring the position of the rods.

26. The method of claim 23 wherein the step of actuating the ejector nut is initiated in response to a signal received from a sensor monitoring the rotational position of the assembly.

27. The method of claim 23, wherein each spline has one of a circular cross-section, a triangular cross-section or a rectangular cross-section.

28. The method of claim 21, wherein the plurality of fingers comprises three fingers.

29. The method of claim 21, wherein the substantially cylindrical object is a screw cap for a container.

30. The method of claim 23, wherein the substantially cylindrical object is a container having a screw cap.

* * * * *